US008716962B2

(12) United States Patent
Pusateri et al.

(10) Patent No.: US 8,716,962 B2
(45) Date of Patent: May 6, 2014

(54) VARIABLE SPEED TRIGGER MECHANISM

(75) Inventors: Daniel Pusateri, Grayslake, IL (US); Kenneth Happ, Burlington, WI (US); James Brehm, Racine, WI (US)

(73) Assignee: Snap-on Incorporated, Kenosha, WI (US)

( * ) Notice: Subject to any disclaimer, the term of this patent is extended or adjusted under 35 U.S.C. 154(b) by 383 days.

(21) Appl. No.: 13/293,840

(22) Filed: Nov. 10, 2011

(65) Prior Publication Data

US 2013/0119915 A1 May 16, 2013

(51) Int. Cl.
*H02P 7/14* (2006.01)

(52) U.S. Cl.
USPC ............................ 318/257; 318/504; 388/937

(58) Field of Classification Search
CPC ......... B25F 5/001; H02P 7/0044; H02P 6/16; H01H 9/063; H01H 1/5833; H01H 2009/065; H01H 9/06; Y10S 388/937; H01C 10/50; B23D 51/10
USPC ......... 318/255, 256, 257, 287, 293, 442, 479, 318/504; 388/907.2, 936, 937
See application file for complete search history.

(56) References Cited

U.S. PATENT DOCUMENTS

| | | | | |
|---|---|---|---|---|
| 3,376,402 | A * | 4/1968 | Bednarski | 200/1 V |
| 3,794,800 | A | 2/1974 | Bodge | |
| 3,814,886 | A * | 6/1974 | Piber | 200/318.1 |
| 4,412,158 | A | 10/1983 | Jefferson et al. | |
| 4,459,522 | A * | 7/1984 | Huber | 318/293 |
| 4,528,544 | A | 7/1985 | Mattson | |
| 4,588,910 | A * | 5/1986 | Bausch | 310/50 |
| 5,072,086 | A | 12/1991 | Fujiyoshi | |
| 5,165,529 | A | 11/1992 | Fujiyoshi | |
| 5,892,885 | A | 4/1999 | Smith et al. | |
| 5,994,853 | A | 11/1999 | Ribbe | |
| 6,155,355 | A | 12/2000 | Holmin | |
| 6,823,134 | B2 | 11/2004 | Glasgow et al. | |
| 8,493,172 | B2 * | 7/2013 | Pusateri et al. | 338/198 |
| 2011/0203821 | A1 | 8/2011 | Puzio et al. | |

FOREIGN PATENT DOCUMENTS

| | | |
|---|---|---|
| DE | 10334884 A1 | 3/2005 |
| JP | 06111688 A | 4/1994 |

OTHER PUBLICATIONS

International Search Report, dated Dec. 28, 2012; 2 pages.
PCT Written Opinion of the International Searching Authority, dated Dec. 28, 2012; 10 pages.

* cited by examiner

*Primary Examiner* — Bentsu Ro
(74) *Attorney, Agent, or Firm* — Seyfarth Shaw LLP

(57) ABSTRACT

A variable speed trigger mechanism that allows a user to reverse a direction of a motor and supply variable amounts of power to the motor using a single trigger mechanism. In a first motion, the user can actuate the reversing module to change the direction of the motor coupled to the trigger mechanism. In a second motion, the user can actuate the same trigger and apply variable amounts of power to the motor.

15 Claims, 5 Drawing Sheets

VARIABLE SPEED TRIGGER MECHANISM

FIELD OF THE INVENTION

The present application relates generally to a trigger for a powered device. More particularly, the present application relates to a variable speed trigger mechanism having mechanical interconnections that allow a user to actuate a reversing switch and supply variable amounts of power to a motor using a single mechanism.

BACKGROUND OF THE INVENTION

Many conventional power tools include triggers or switches that facilitate the transfer of power from a power source to a motor of the tool. For example, power drills have variable speed triggers that transfer a small amount of power to the motor when the trigger is depressed only slightly, but transfer a greater amount of power when fully depressed, thus causing the motor output to increase. These conventional tools may further include a reversing lever or switch that allows the user to reverse the rotational direction of the power tool to, for example, remove a workpiece from a working material. A power source, such as a battery, is coupled to the trigger and the reversing lever to provide appropriate power to the motor, which causes a motor to rotate in a desired direction and speed.

In the conventional tool, the trigger is a variable speed trigger where the amount of power transferred from the power source to the motor depends on how far the trigger is depressed. However, to reverse the direction of the output of the motor, the user must release the trigger and actuate the separate reversing lever located on the tool.

More recent developments in power tools have provided a toggle switch and trigger combination. The combination switch is a simple double-pole-double-throw switch configurable in two positions—forward and reverse. The combination switch supplies power to the motor at only one rotational speed, but can do so in either rotational direction without requiring a separate reversing lever.

Other recent developments have combined a toggle switch with two variable speed triggers so a user can actuate the trigger in a first direction to cause the output of the motor to rotate in a first direction, and can actuate the trigger in a second direction to cause the output of the motor to rotate in a second direction. This design requires two separate triggers that are mechanically coupled together by a rotating toggle switch and are somewhat expensive to manufacture due to the requirement of two switches.

SUMMARY OF THE INVENTION

The present application discloses a variable speed toggle switch that allows a user to reverse the rotational direction of the output of a motor and supply variable amounts of power to the motor using a single trigger mechanism. The trigger mechanism includes mechanical interconnections from a trigger to a reversing module and, once the reversing module is actuated to the preferred motor direction, the trigger mechanism can be variably actuated by the user to supply variable amounts of power to the motor, thus controlling the output speed of the motor. The trigger thus allows the user to control the output direction and output speed of the motor without requiring a separate direction switching action other than the simple pivoting of the trigger into the desired position.

In particular, the present application discloses a trigger mechanism for supplying variable amounts of power from a power supply to a motor, the mechanism including a trigger movable between first and second directional positions and movable between first and second power supply positions; and a reversing module adapted to selectively couple the trigger to the motor in one of a first output direction and a second output direction based on whether the trigger is in one of the first directional position and the second directional position, wherein when the trigger is moved from the first power supply position toward the second power supply position, the power supply variably supplies power to the motor.

Also disclosed is a trigger mechanism for supplying power from a power source to a motor, the trigger mechanism including a trigger movable between first and second directional positions and movable between first and second power supply positions; and a reversing module operably coupled to the trigger and adapted to reverse an output direction of the motor based on the trigger being moved toward one of the first directional position and the second directional position, wherein the trigger is adapted to be operably coupled to the power supply to facilitate the flow of power from the power supply to the motor when the trigger is moved from the first power supply position toward the second power supply position.

A method of variably supplying power to a motor is also disclosed and includes providing a trigger movable between first and second directional positions and first and second power supplying positions; coupling the trigger to the motor in a first directional orientation when the trigger is moved toward the first directional position and coupling the trigger to the motor in a second directional orientation when the trigger is moved toward the second directional position; and facilitating a variable transfer of power from the power source to the motor when the trigger is moved toward one of the first and second power supplying positions.

BRIEF DESCRIPTION OF THE DRAWINGS

For the purpose of facilitating an understanding of the subject matter sought to be protected, there is illustrated in the accompanying drawing embodiments thereof, from an inspection of which, when considered in connection with the following description, the subject matter sought to be protected, its construction and operation, and many of its advantages should be readily understood and appreciated.

DETAILED DESCRIPTION OF THE PREFERRED EMBODIMENTS

Figure 1:
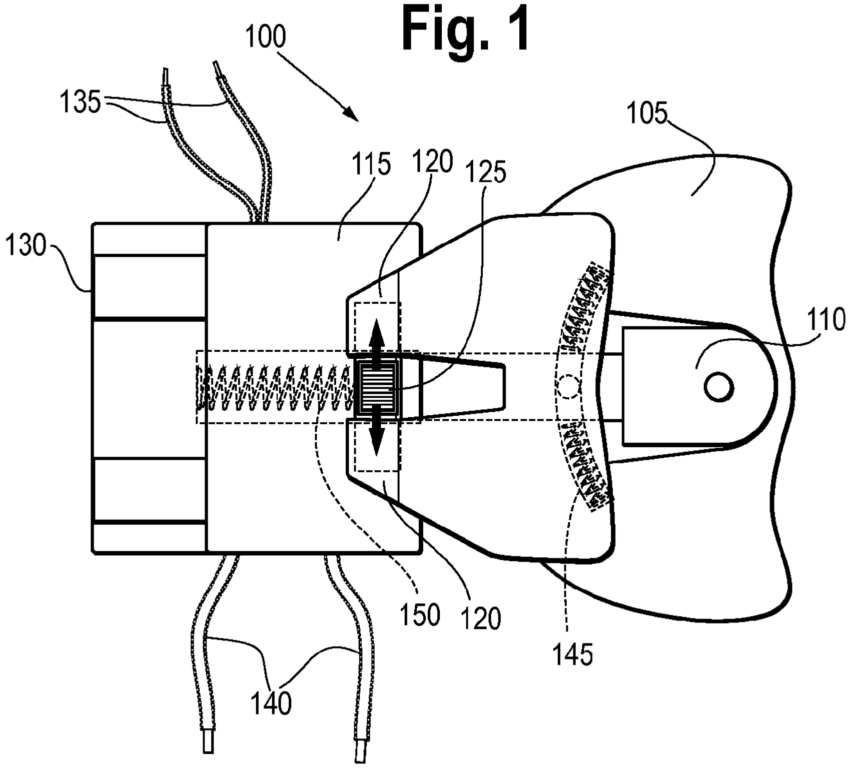
FIG. 1 is a top plan view of a variable speed trigger of the present application disposed in the neutral position.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

The present application discloses a variable speed trigger adapted to allow a user to reverse the rotational direction of the output of a motor and to also supply variable amounts of power to the motor using a single trigger mechanism, thus controlling the rotational speed of the output of the motor. In an embodiment, a user can actuate the reversing module in a first motion to change the rotational direction of, for example, the output of a motor coupled to the trigger. In a second motion, the user can actuate the trigger and apply variable amounts of power to the motor.

Figure 2:
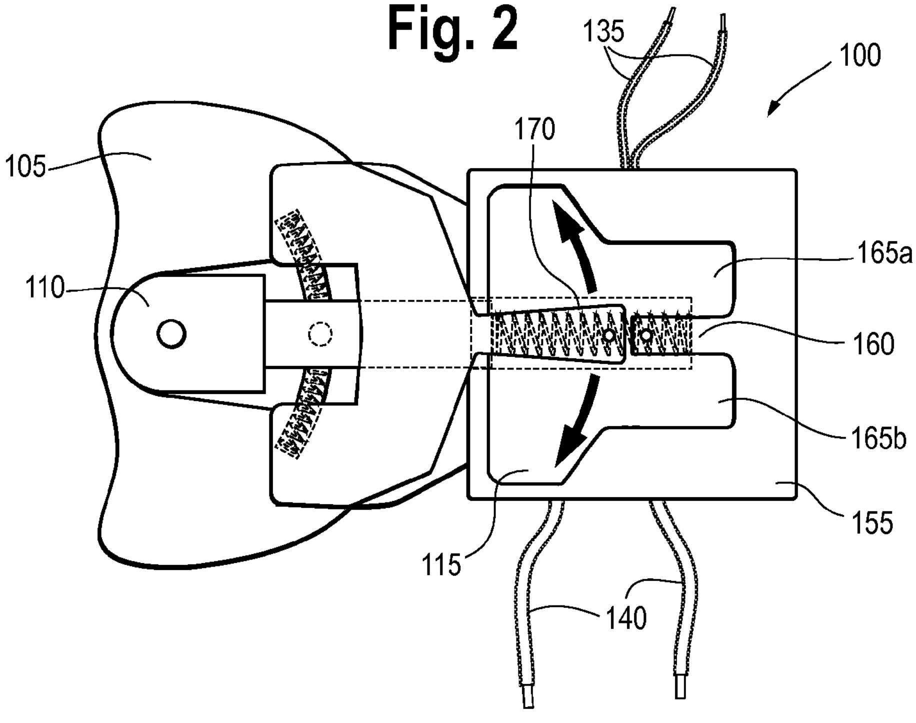
FIG. 2 is a bottom plan view of the variable speed trigger of FIG. 1.

As shown in FIGS. 1 and 2, the variable speed trigger mechanism 100 includes a trigger 105 pivotable about a pivot column 110 and coupled to a reversing module 115 at arms 120 of the trigger 105. The reversing module 115 includes a lever 125 that, when actuated by the arms 120 of the trigger 105, causes a switch 130 to electrically couple the trigger 105 to a motor and cause the motor to output rotational movement in either a first direction or a second direction. The trigger mechanism 100 also includes first wires 135 or second wires 140 that connect to the motor and/or to a power source. The trigger 105 can be biased to a neutral position by a vertical biasing member 145 in which no motor direction is chosen by the switch 130 or where the previous motor direction is not changed by the switch 130. Also, a horizontal biasing member 150 can bias the trigger 105 to a first power supply position in which substantially no power is transferred through the trigger mechanism 100. As shown in FIG. 2, the trigger mechanism 100 also includes a lock stop 160 positioned between two channels 165*a*, 165*b* and adapted to abut against a lock 170.

The trigger 105 and pivot column 110 can be any shape or size and can be constructed of any material without departing from the spirit and scope of the present application. In an embodiment, the trigger 105 is ergonomically shaped to fit the contours of a user's finger or thumb, and can include contours to receive two or more fingers of the user and allow the user to pivotally rotate the trigger 105 about the pivot column 110. The pivot column 110 can be frictionally engaged or otherwise coupled to the trigger 105 to allow rotational movement of the trigger 105. The trigger 105 can thus rotate in either a clockwise or counterclockwise direction to move the trigger 105 towards a first directional position (e.g. the farthest clockwise position) or a second directional position (e.g. the farthest counterclockwise position). Alternately, the trigger 105 can be substantially flat to allow the user to move a finger between the front and rear sides of the trigger 105. In the flat trigger embodiment, the first directional position can be the forward-most rotated position, and the second directional position can be the rearward-most rotated position, for example. It will be appreciated that any other first and second directional positions can be used to control the amount of power that is selectively actuated by the trigger mechanism 100.

The reversing module 115 can be any electrical circuit or series of circuits that couple the trigger 105 to external devices that operate in two directions, such as a motor, depending on whether the trigger 105 has been moved toward or to the first directional position or the second directional position. For example, the reversing module 115 can include circuitry that includes field effect transistors such as metal oxide field effect transistors (MOSFET) that are selectable by the switch 130 so that variable speed can be applied via a particular MOSFET depending on whether that MOSFET will drive the external device in the desired direction. Alternately, the reversing module 115 can include an H-bridge to select the proper MOSFET combination and thus drive the external device (e.g., a motor) in the desired direction, as is well known in the art of motor control. Any other field effect circuit similar to the above, wherein a motor direction can be selectively controlled, can be implemented without departing from the spirit and scope of the present application.

The switch 130 is coupled to the reversing module 115 and electrically couples the reversing lever 125 with the external component when the reversing lever 125 is actuated toward or to the first directional position or the second directional position. As a result, the trigger 105 can cause the output of power in one direction by, for example, actuating the trigger 105 toward the first directional position, or can cause the output of power in a second direction by actuating the trigger 105 toward the second directional position. In an embodiment, the switch 130 can be biased to control the external component in a particular directional position, even when the trigger 105 itself is in the neutral directional position. Alternately, the switch 130 can be omitted from the trigger mechanism 100 altogether and the lever 125 can be directly coupled to the external component based on the actuation direction of the trigger 105.

The vertical biasing member 145 and the horizontal biasing member 150 are adapted to bias the trigger 105 into a first power supply position wherein substantially no power is transferred through the switch 100. As shown, the vertical biasing member 145 and the horizontal biasing member 150 are springs, such as coil springs, but any other form of biasing member can be used without departing from the spirit and scope of the present application. For example, the vertical biasing member 145 and the horizontal biasing member 150 can be leaf springs, torsion springs, flat springs, cantilevered springs, elastic materials, or any other structure that can bias the trigger 105 to a neutral directional and power distribution position. Of course, the vertical biasing member 145 and the horizontal biasing member 150 need not be the same form of biasing member, and can include any different numbers of biasing members, without departing from the sprit and scope of the present application.

The case 155 can include a structure that allows the trigger 105 to facilitate the transfer of power in a desired amount and direction. For example, the case 155 can include a lock stop 160 disposed between two channels 155*a*, 155*b* and abut the lock 170. The lock stop 160 can frictionally engage the lock 170 when the trigger 105 is in the neutral direction position. For example, the lock stop 160 can be a member of the case 155 that engages a rounded outer surface of the lock 170 when the lock 170 rotates past the lock stop 160.

Figure 3:
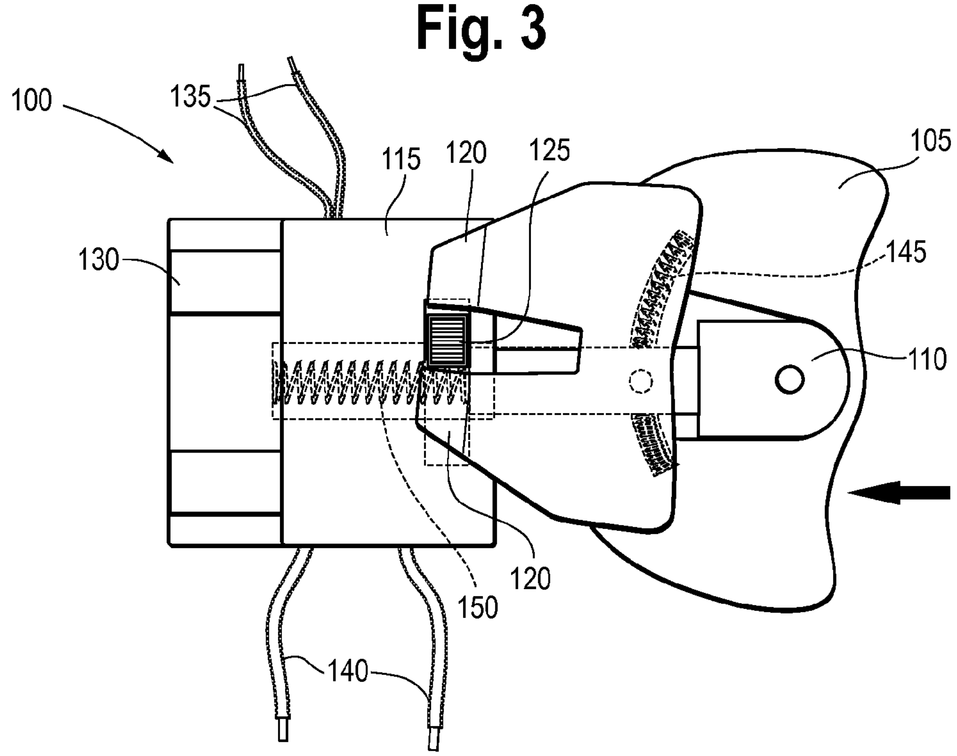
FIG. 3 is a top plan view of the variable speed trigger of FIG. 1 actuated in the first position.
Figure 4:
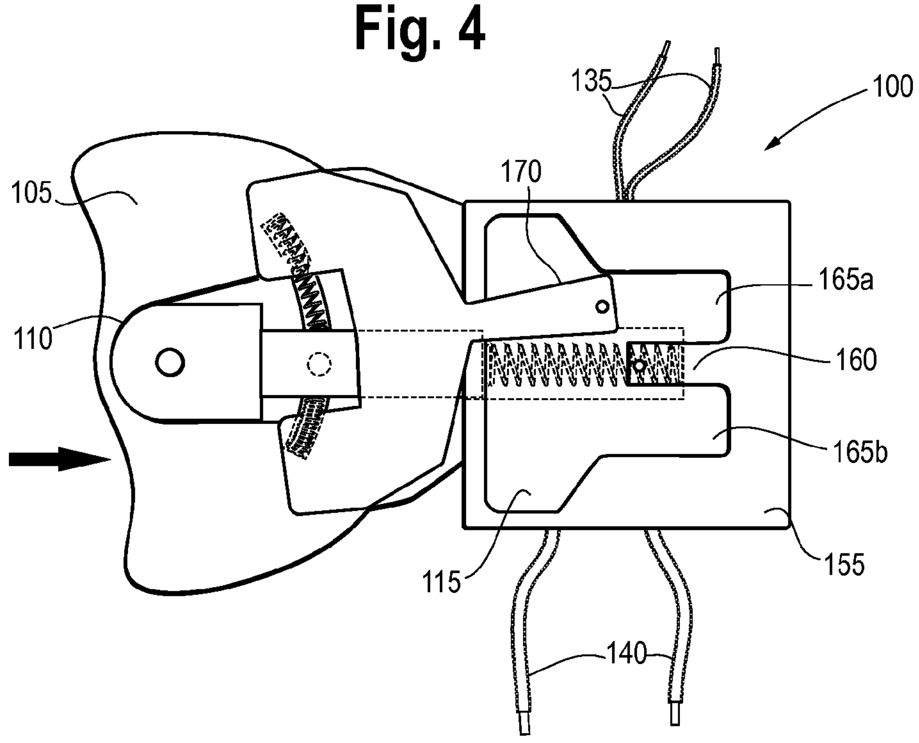
FIG. 4 is a bottom plan view of the variable speed trigger of FIG. 3.
Figure 5:
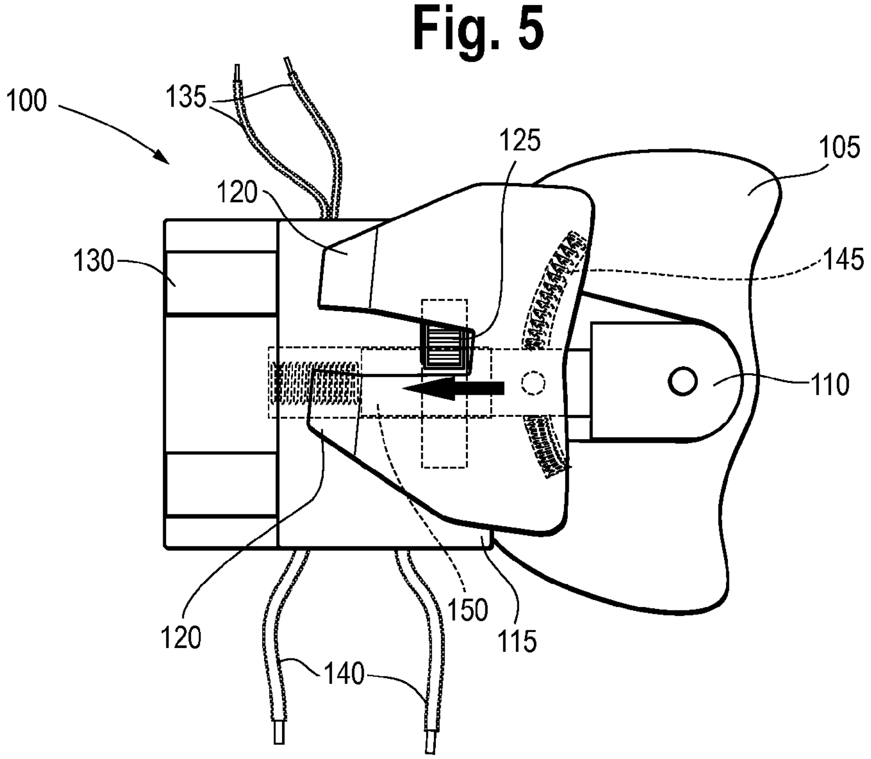
FIG. 5 is a top plan view of the variable speed trigger of the present application engaged so as to apply a variable amount of power to a motor or other powered device.
Figure 6:
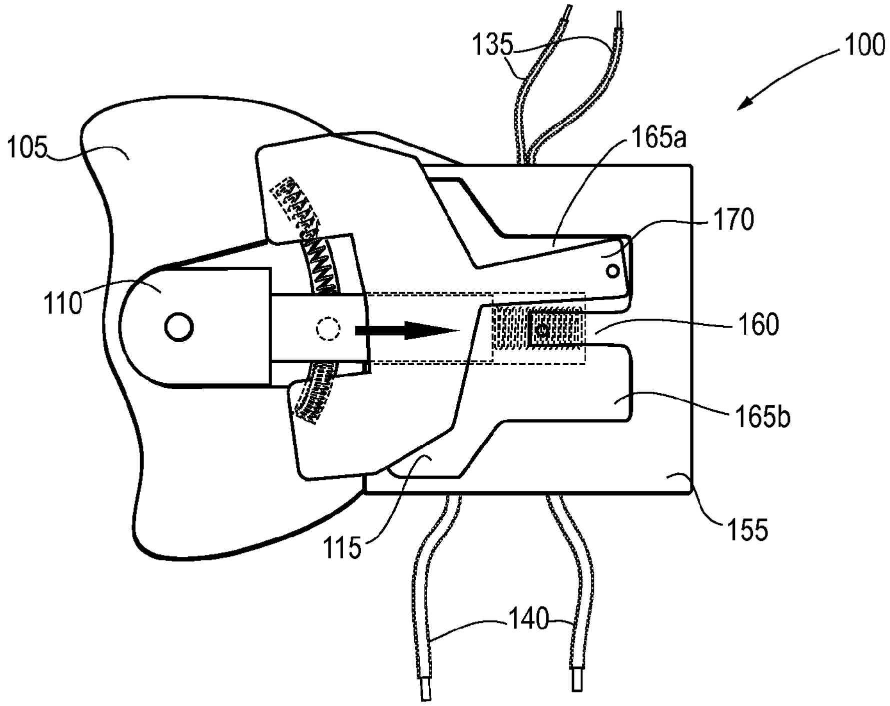
FIG. 6 is a bottom plan view of the variable speed trigger of FIG. 5.

As shown in FIGS. 1 and 2, the trigger 105 can be disposed in the neutral directional position where the lever 125 is substantially horizontal, denoting that the user has not chosen which direction to output power through a motor, for example. In FIGS. 3 and 4, the user has pressed the bottom portion of the trigger to rotate the lever 125 with the arms 120 and thus connect the trigger 105 to the motor in a first motor output direction. As shown in FIG. 4, the lock 170 disengages from the lock stop 160 and positions itself just outside the first channel 165*a*. The user can then press the trigger 105 inward against the bias of the horizontal biasing member 150 to a desired position to supply a desired amount of power to the motor based on the actuation amount of the trigger 105. The maximum amount of transferred power will be obtained when the lock 170 substantially reaches the end of the selected channel, in this case the first channel 165*a*. Once the user has completed operation of the trigger mechanism 100, the trigger 105 can be released, causing the trigger 105 to retract out of the channel 165*a* under the bias of the horizontal bias member 150 and halt the transfer of power to the motor. The trigger 105 can then rotate back to the neutral directional position under the bias of the vertical biasing member 145 and thus return to the position shown in FIG. 1.

Figure 7:
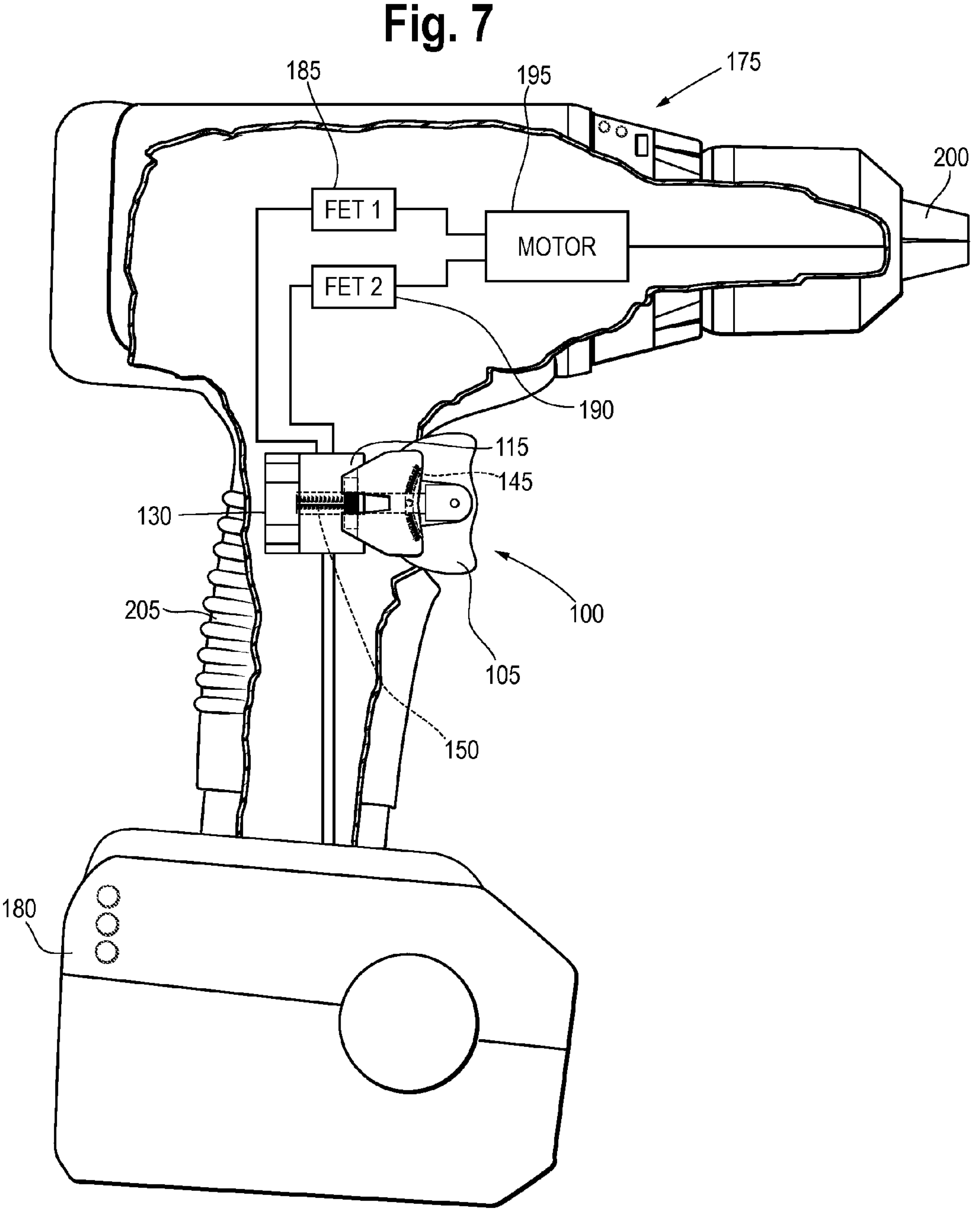
FIG. 7 depicts an embodiment of the variable speed trigger of the present application incorporated into a power tool.

FIG. 7 illustrates an implementation of the trigger mechanism 100 within a tool 175, such as a power drill. As shown, the tool 175 includes the trigger mechanism 100 operably coupled to a power source 180, such as, for example, a battery. The switch 130 is selectively coupled to either a first field effect transistor 185 or a second field effect transistor 190, depending on the actuation direction of the trigger 105. The selected field effect transistor 185, 190 allows power to transfer to a motor 195 to turn a working end of the tool, for example, a drill chuck 200. Opposite the trigger 105 is a grip 205 to help the user hold the tool 175 and operate the trigger mechanism 100.

The power source 180 can be any source of electrical or mechanical power that can drive the motor 195. In an embodiment, the power source 180 is a battery. However, the power source 180 can be any component that provides power, including a battery, fuel cell, engine, solar power system, wind power system, hydroelectric power system, a power cord for attachment to an electrical socket, or any other means of providing power.

In an embodiment, the field effect transistors 185, 190 can be metal oxide semiconductor field effect transistors (MOSFET). In this example, the first and second MOSFETS 185, 190 can communicate with the motor 195 to allow the selective transmission of power to the motor 195 based on the rotational direction of the trigger 105. For example, if the user actuates the trigger 105 toward the first directional position, the switch 130 can connect the trigger 105 to the first MOSFET 185 to controllably facilitate the transfer of power to the motor 195 such that the motor output rotates in the desired direction and speed. However, if the user actuates the trigger 105 toward the second position, the switch 130 can connect the trigger 105 to the second MOSFET 190 to supply power to the motor 195 in a direction opposite that of the first MOSFET 185. Selective movement of the trigger 105 therefore selects the appropriate field effect transistor 185, 190 based on the desired motor output direction. Alternately, an H-bridge can be used to selectively supply power to an appropriate field effect transistor, as is well known in the art. When the trigger 105 is actuated from the first power supply position toward the second power supply position against the bias of the horizontal biasing members 185, 190, the trigger 105 supplies power from the power source 180 to the motor 195.

The motor 195 can be any type of motor, including an electrical, internal combustion, electrochemical, or any other form of motor that can impart axial or rotational motion to an object. In an embodiment, the motor 195 is an electrical motor capable of outputting rotational power in either a clockwise or counterclockwise direction based on separate inputs that each communicates with the field effect transistors 185, 190.

The chuck 200 is located at the working end of the tool 175 and serves to hold a tool bit or other working mechanism and provide direct rotational movement to the tool bit in a well known manner. The chuck 200 can be any shape or material, and, in an embodiment, is frustraconical with several radial segments that converge to frictionally engage a tool bit. The tool bit itself can be any instrument that can transmit torque or impact on a workpiece. For example, the tool bit can be a drill bit, a Phillips head or flat head screwdriver, an endmill, socket, impact driver, or any other object that can be inserted into the chuck 200 and assist the user in machining or fastening a working material.

The grip 205 is disposed opposite the trigger 105 on the main body of the tool 175. The grip 205 can be any structure or material that allows the user to grasp the tool 175 in a well-known manner. In an embodiment, the grip 205 can be ergonomically shaped to fit the user's hand and allow a convenient and comfortable position for the user to engage the trigger 105 with a finger or thumb. As shown, the grip 205 can be a textured surface of the body of the tool 175, or can be a separate material and structure that is coupled to the tool 175 by, e.g., adhesive. For example, the grip 205 can be made of rubber, metal, foam, leather, or any other material that helps the user grip the tool 175.

Figure 8:
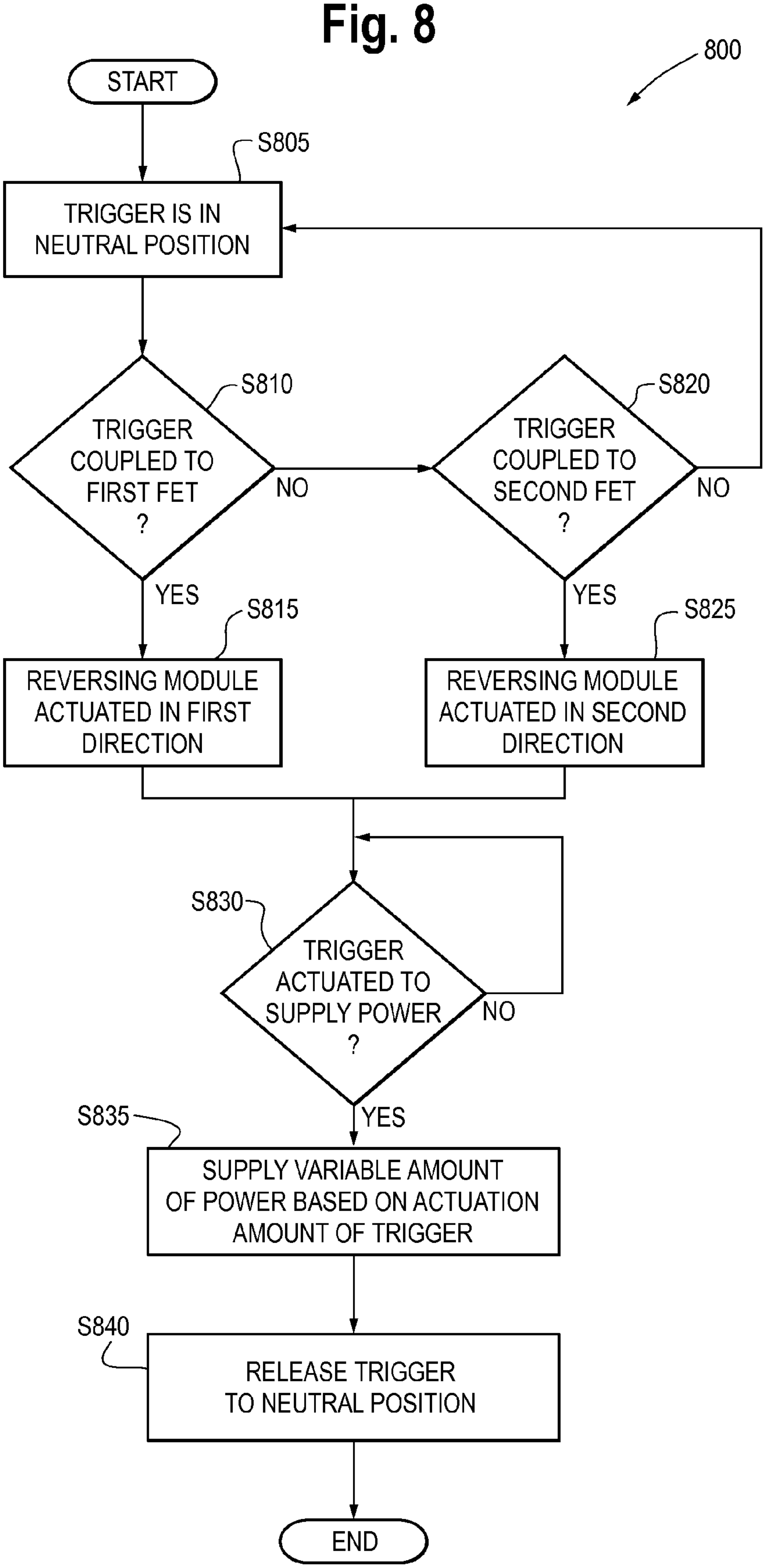
FIG. 8 is a flow chart depicting an exemplary method of operating a variable speed trigger of the present application.

A method 800 of using the trigger mechanism 100 will now be discussed with reference to FIG. 8. As shown, the process begins at step S805 where the trigger 105 is disposed in the neutral position. It is then determined whether the trigger 105 is coupled to the first field effect transistor 185 at S810, at which the trigger 105 is linked to a motor or other device in a first output direction of the motor S815. If the trigger 105 is not coupled to the first field effect transistor 185 at S810, the process proceeds to S820 where it is determined whether the trigger is coupled to the second field effect transistor 190, and if so, the process proceeds to S825 at which point the trigger 105 is linked to a motor or other device in a second output direction of the motor S815. At this stage of the process, the trigger 105 has not caused any substantial amount of power to be transmitted to the motor so as to cause the motor to output a substantial amount of rotational or linear speed. Thus, the user can actuate the trigger 105 to select a desired output direction (clockwise or counterclockwise, for example) without expending a substantial amount of power and without outputting a substantial amount of torque from the motor.

The process then proceeds to step S830, where it is determined whether the trigger 105 is actuated so as to supply power from a power source to the motor. For example, the process waits for a user to actuate the trigger 105 by pulling on the trigger or otherwise moving the trigger a variable amount. The trigger then transmits an amount of power through the first 185 or second 190 field effect transistor to allow the field effect transistors 185, 190 to transmit power to the motor. The amount of power transmitted to the field effect transistors 185, 190 is directly related to the actuation amount of the trigger 105. If the user pulls slightly on the trigger 105, the power transmitted to the selected field effect transistor 185 will be minimal, while a larger actuation amount on the trigger 105 will yield a greater amount of power transmitted to the selected field effect transistor 190. As such, when the process proceeds to S835, a variable amount of power is supplied to the motor based on the actuation amount of the trigger 105. Once the trigger 105 is released, the vertical biasing member 145 and the horizontal biasing member 150 bias the trigger 105 to the neutral position S840, where the process ends.

The exemplary embodiments of this application have implemented the trigger mechanism 100 in power tools such as a drill, or have implemented the trigger mechanism 100 with a motor 195. However, the invention is not limited to implementation in drills or motors. Any other device can implement the trigger mechanism 100 without departing from the spirit and scope of the present application. For example, the trigger mechanism 100 can be installed in an electric or air-powered drive tool, a power saw, a vacuum cleaner, or any other device that can implement a variable speed electrical toggle trigger mechanism.

The manner set forth in the foregoing description and accompanying drawings and examples, is offered by way of illustration only and not as a limitation. More particular embodiments have been shown and described, and it will be apparent to those skilled in the art that changes and modifications may be made without departing from the broader aspects of Applicant's contribution. The actual scope of the protection sought is intended to be defined in the following claims when viewed in their proper prospective based on the prior art.

What is claimed is:

1. A trigger mechanism for supplying variable amounts of power from a power supply to a motor, the mechanism comprising:

a trigger movable between first and second directional positions and movable between first and second power supply positions; and a reversing module adapted to selectively couple the trigger to the motor in one of a first output direction and a second output direction based on whether the trigger is in one of the first directional position and the second directional position, wherein when the trigger is moved from the first power supply position toward the second power supply position, the power supply variably supplies power to the motor.

2. The trigger mechanism of claim 1, further comprising a first biasing member adapted to bias the trigger to a neutral directional position in which the trigger is not substantially moved toward either of the first and second directional positions.

3. The trigger mechanism of claim 1, further comprising a second biasing member adapted to bias the trigger to the first power supply position.

4. The trigger mechanism of claim 1, wherein the reversing module further includes a lever adapted to be actuated by the trigger to selectively couple the trigger to motor without substantially changing the amount of power supplied to the motor.

5. The trigger mechanism of claim 2, further comprising a lock frictionally engaged with a lock stop and adapted to maintain the trigger in the neutral directional position.

6. The trigger mechanism of claim 5, further comprising first and second channels disposed on opposing sides of the lock stop and adapted to receive the lock when the trigger is actuated toward the second power supply position, the first channel adapted to receive the lock when the trigger is actuated toward the first directional position and the second channel adapted to receive the lock when the trigger is actuated toward the second directional position.

7. A trigger mechanism for supplying power from a power source to a motor, the trigger mechanism comprising:

a trigger movable between first and second directional positions and movable between first and second power supply positions; and a reversing module operably coupled to the trigger and adapted to reverse an output direction of the motor based on the trigger being moved toward one of the first directional position and the second directional position, wherein the trigger is adapted to be operably coupled to the power supply to facilitate the flow of power from the power supply to the motor when the trigger is moved from the first power supply position toward the second power supply position.

8. The trigger mechanism of claim 7, wherein the trigger is adapted to be actuated toward the first and second directional positions without substantially changing the amount of the power supplied to the motor.

9. The trigger mechanism of claim 7, further comprising a first biasing member adapted to bias the trigger to a neutral directional position in which the trigger is not substantially moved toward either of the first and second directional positions.

10. The trigger mechanism of claim 9, further comprising a second biasing member adapted to bias the trigger into the first power supply position.

11. The trigger mechanism of claim 9, further comprising a lock frictionally engaged with a lock stop when the trigger is in the neutral directional position.

12. The trigger mechanism of claim 11, further comprising first and second channels disposed on opposing sides of the lock stop and adapted to receive the lock when the trigger is actuated toward the second power supply position, the first channel adapted to receive the lock when the trigger is actuated toward the first directional position and the second channel adapted to receive the lock when the trigger is actuated toward the second directional position.

13. A method of variably supplying power to a motor comprising:

providing a trigger movable between first and second directional positions and first and second power supplying positions;

coupling the trigger to the motor in a first directional orientation when the trigger is moved toward the first directional position and coupling the trigger to the motor in a second directional orientation when the trigger is moved toward the second directional position; and facilitating a variable transfer of power from the power source to the motor when the trigger is moved toward one of the first and second power supplying positions.

14. The method of claim 13, further comprising biasing the trigger in a neutral directional position in which the trigger is substantially equally distanced from the first directional position and the second directional position.

15. The method of claim 13, further comprising biasing the trigger toward the first power supplying position in which substantially no power is transferred to the motor.

* * * * *